CLIFFORD G. DORN
HAROLD B. DUNKELBERGER
INVENTORS

BY T. M. Phillips
J. M. St. Amand
ATTORNEYS

CLIFFORD G. DORN
HAROLD B. DUNKELBERGER
INVENTORS

BY H. M. Phillips
J. M. St. Amand
ATTORNEYS

United States Patent Office 3,274,510

Patented Sept. 20, 1966

3,274,510

AUTOMATIC FREQUENCY CONTROL FOR KLYSTRON COUPLING REGULATOR TUBE TO KLYSTRON SHELL

Clifford G. Dorn, Corona, and Harold B. Dunkelberger, Riverside, Calif., assignors to the United States of America as represented by the Secretary of the Navy

Filed Nov. 24, 1964, Ser. No. 413,660

3 Claims. (Cl. 331—6)

The invention herein described may be manufactured and used by or for the Government of the United States of America for governmental purposes without the payment of any royalties thereon or therefor.

The present invention relates to the frequency control of klystron oscillators driven by a "Pound" type discriminator.

In the conventional automatic frequency control of klystrons, the repeller voltage is varied directly. This was done by means of complicated vacuum tube circuitry and utilized voltages which were high and unsafe. The present invention avoids the above mentioned disadvantages by a novel arrangement of a semiconductor amplifier and a series regulator tube for varying the klystron shell voltage and beam current.

Accordingly, an object of the present invention is to provide an improved automatic frequency control system which avoids the above mentioned disadvantages of conventional systems.

A further object of the invention is the provision of a simple yet reliable automatic frequency control circuit for a klystron oscillator while maintaining the shell of the klystron at or near ground potential.

Other objects and many of the attendant advantages of this invention will become readily appreciated as the same becomes better understood by reference to the following detailed description when considered in connection with the accompanying drawings wherein.

Figure 1:
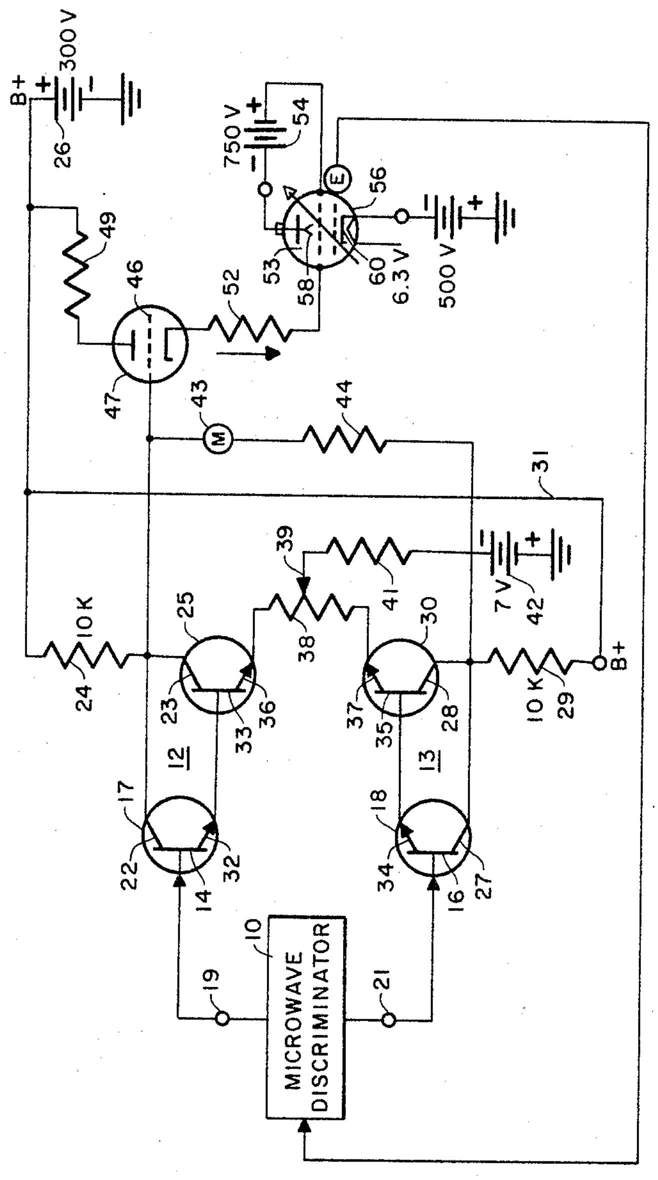
FIG. 1 is a schematic circuit diagram of a preferred embodiment of the invention.

Referring now to the drawings there is shown in FIG. 1 a discriminator 10 which in the preferred embodiment is a conventional Pound microwave discriminator. A differential amplifier 11 consisting of two identical tandem stages 12, 13 is connected to the outputs of discriminator 10. Bases 14 and 16 of transistors 17 and 18 are connected respectively to output terminals 19 and 21 of discriminator 10. Collectors 22 and 23 of transistors 17 and 25 are connected through resistor 24 to B+ supply 26 and collectors 27 and 28 of transistors 18 and 30 are connected through resistor 29 and lead 31 to B+ supply 26. Emitter 32 of transistor 17 is connected to base 33 of transistor 25 while emitter 34 of transistor 18 is connected to base 35 of transistor 30. Emitters 36 and 37 of transistors 25 and 30 are connected through a common emitter resistor 38. Resistor 38 has a movable tap 39 which is connected through resistor 41 to bias voltage source 42. A meter 43 is connected in series with resistor 44 across the output of differential amplifier 11. The output of amplifier 11 is connected to control grid 46 of series regulator triode tube 47. The plate of tube 47 is connected to B+ voltage source 26 through plate resistor 49 while the cathode is connected through cathode resistor 52 to the shell of a klystron 53.

Figure 2:
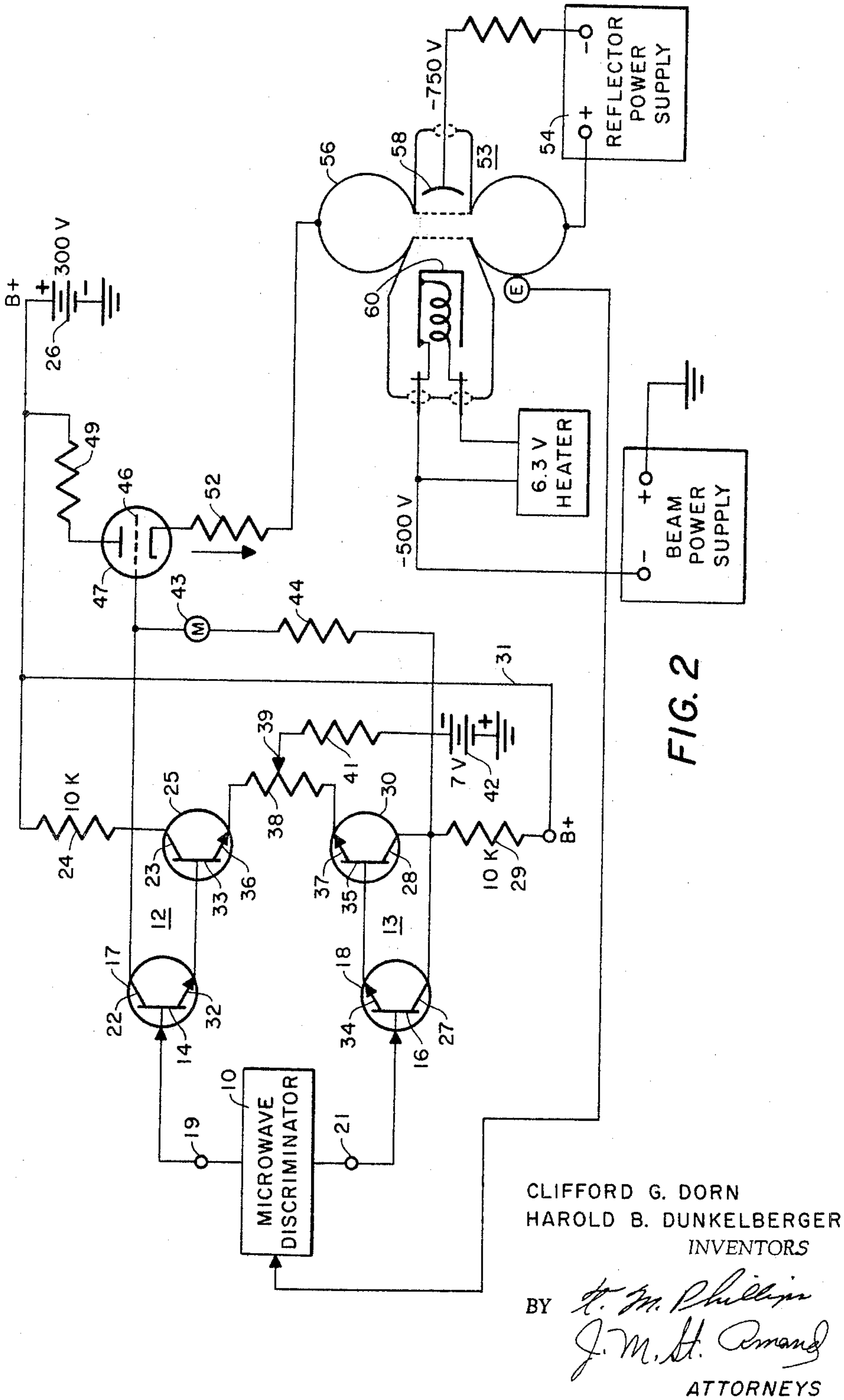
FIG. 2 is a schematic diagram showing the physical connection to a reflex klystron.

In FIG. 2, the physical connections that are made in practicing the invention are indicated, however, there would be no difference in the operation of the system. Corresponding elements have been assigned the same reference characters that are used in FIG. 1.

In operation referring to FIGS. 1 and 2, discriminator

10 provides a differential output at terminals 19 and 21. These outputs are balanced to be equal in voltage by discriminator adjustments (not shown) when its oscillator is operating at the desired frequency (center frequency).

The outputs from discriminator 10 are fed into amplifier stages 12 and 13 of differential amplifier 11. The voltage of bias voltage source 42 is adjusted for the optimum bias current depending on the amplitude of the voltage inputs and the type of transistors used. The collector voltage (B+ supply 26) must be within the rating of the transistors and of high enough amplitude to allow the voltage swing required at grid 46 of tube 47. Common emitter resistor 38 is adjusted to balance the amplifier 11 when the voltages at terminals 19 and 21 are equal. Resistor 44 is provided to limit current flow in monitoring meter 43. Resistor 41 is a negative feedback resistor for differential amplifier operation and by the proper choice of resistor may provide stabilization and temperature compensation. Resistors 24 and 29 should be approximately equal in value, while resistor 29 is equal to the equivalent resistance of resistor 24 and the input resistance of tube 47 is parallel. Resistor 52 is chosen to develop a bias so that tube 47 operates as a series regulator in the center of its range when klystron 53 is operating at center frequency. The value of resistor 49 should be such that when klystron 53 is operating at center frequency, the shell 56 of klystron 53 is at or near ground potential. Tube 56 is supplied operating current by series regulator tube 47. This current flows from power supply 26 through tube 47 and through the electron beam and cathode of tube 56 to the beam power supply. The ground connection of the beam power supply is common with the ground connection of power supply 26, thus completing the circuit path. As the grid voltage of tube 47 varies, the current flowing through resistors 49 and 52 varies to change the voltage on the shell of tube 56. This varies the transit time of electrons through tube 56 which varies the frequency of oscillation.

The voltages from discriminator 10 outputs 19 and 21 caused by frequency drift or jitter in the discriminator oscillator are amplified in differential transistor amplifier 11. An increase in voltage at the input to transistor 17 causes an increase in current flow therein which is amplified and applied to transistor 25. An increase in current flow in transistor 25 increases the voltage drop across resistors 24 and 41. At the same time a corresponding decrease in voltage at the input to transistor 18 causes a decrease in current therein which is amplified and applied to transistor 30. A decrease in current in transistor 30 decreases the voltage drop across resistor 29 and resistor 41, thus compensating for the increased voltage at terminal 19. This allows additional current flow in transistor 25 causing more voltage drop across resistor 24. The differential in voltage at collectors 23 and 28 causes a current flow in meter 43. This gives a visual indication of distance off center frequency. The increased drop across resistor 24 is supplied to grid 46 of tube 47 decreasing the current flow through klystron 53 by increasing the internal resistance of tube 47. The reduced current flow in klystron 53 causes a shift in frequency back to the center frequency; thus restoring balance to the system. If the output voltage at terminal 19 decreases and the output at terminal 21 increases, the operation explained above is repeated in reverse.

As shown in each of FIGS. 1 and 2, a constant voltage is applied to repeller electrode 58. The potential of electrode 58 with respect to shell 56 remains constant as the shell voltage is varied with respect to ground. The potential of repeller 58 varies with respect to ground as the shell voltage varies (as can be seen the two are tied together through power source 54) with respect to ground. The potential of cathode 60 will vary with respect to shell 56 and repeller 58 and as a result the speed of electron flow is changed which changes the frequency of oscillator.

Obviously many modifications and variations of the present invention are possible in the light of the above teachings. It is therefore to be understood that within the scope of the appended claims the invention may be practiced otherwise than as specifically described.

What is claimed is:

1. In a circuit for controlling the output frequency of a klystron oscillator, the combination comprising:

(a) sensing means coupled to said klystron for producing an output signal proportional to deviations of the output frequency of said oscillator from a predetermined value, (b) differential amplifier means coupled to said sensing means for amplifying said output signal, (c) a reference voltage source, (d) a series regulator tube connected between one side of said reference voltage source and the shell of said klystron, (e) said series regulator tube having an input coupled to the output of said amplifier and being coupled through the electron flow stream of said klystron to the other side of said reference voltage source and being responsive to the output signal from said sensing means for controlling the output frequency of said klystron.

2. In a circuit for controlling the output frequency of a klystron oscillator, the combination comprising:

(a) sensing means coupled to said klystron for producing an output signal proportional to deviations of the output frequency of said oscillator from a predetermined value, (b) differential amplifier means coupled to said sensing means for amplifying said output signal, (c) a voltage source connected between the shell and the repeller electrode of said klystron for negatively biasing said repeller electrode at a constant predetermined value with respect to said shell, (d) a reference voltage source, (e) a series regulator tube connected between one side of said reference voltage source and the shell of said klystron, (f) said series regulator tube having an input coupled to the output of said amplifier and being coupled through the electron flow stream of said klystron to the other side of said reference voltage source and being responsive to the output signal from said sensing means for varying the potential of the shell with respect to ground to control the output frequency of said klystron oscillator.

3. In a circuit for controlling the output frequency of a klystron oscillator, the combination comprising:

(a) sensing means coupled to said klystron for producing an output signal proportional to deviations of the output frequency of said oscillator from a predetermined value, (b) differential amplifier means coupled to said sensing means for amplifying said output signal, (c) a voltage source connected between the shell and the repeller electrode of said klystron for maintaining a constant negative bias of a predetermined value with respect to said shell, (d) a reference voltage source, (e) a series regulator tube connected between one side of said reference voltage source and the shell of said klystron, (f) said series regulator tube having an input coupled to the output of said amplifier and being coupled through the electron flow stream of said klystron to the other side of said reference voltage source and being responsive to the output signal from said sensing means for varying the potential of the shell proportional to deviation of the output frequency of said oscillator from a predetermined value and in a direction to cause said deviation to approach zero deviation.

No references cited.

ROY LAKE, *Primary Examiner.*

J. KOMINSKI, *Assistant Examiner.*